INVENTORS
RONALD V. HAMILL &
WALTER E. MURPHY
BY
ATTORNEY

United States Patent Office 3,441,932
Patented Apr. 29, 1969

3,441,932
DYNAMIC HIT-WIDTH DISCRIMINATOR
Ronald V. Hamill, King of Prussia, and Walter E. Murphy, Malvern, Pa., assignors to the United States of America as represented by the Secretary of the Army and/or the Administrator of the Federal Aviation Administration
Filed Mar. 8, 1968, Ser. No. 711,561
Int. Cl. G01s 7/28
U.S. Cl. 343—17.1                                 6 Claims

ABSTRACT OF THE DISCLOSURE

The present invention relates to apparatus for use in a radar system which prevents multiple range reporting of single targets which extend over more than a single range cell. This is accomplished by use of logic gating circuitry and a counter which counts at a desired range clock rate so as to permit only one hit to be declared during the counter cycle.

Background of the invention

Several problems generally exist in the discrimination of radar returns. One problem is that the normal time duration of a return from a single aircraft is approximately equal to the pulse width transmitted by the radar. This width, however, may be increased by multiple returns from closely spaced targets or the return may be of long duration due to the presence of weather, clutter or other phenomenia. Another problem is that when any of the received radar returns are quantized for insertion into discrete range cells, even the normal return may overlap more than a single range cell.

Accordingly, it is an object of the present invention to provide means for overcoming the above discussed problems.

It is another object of the present invention to prevent multiple range reporting of single target radar returns which extend over more than a single range cell.

It is a further object of the present invention to provide means for converting a normal radar return into a single pulse having a width equal to the basic clock period.

It is yet a further object of the present invention to provide means for converting a wide pulse return into a series of clock period pulses occurring at a rate equal to the memory resolution of the system.

Other objects and many of the attendant advantages of this invention will become more fully apparent from the following detailed description when considered in connection with the accompanying drawings, which illustrate a preferred embodiment, and wherein:

Description of the preferred embodiment

Figure 1:
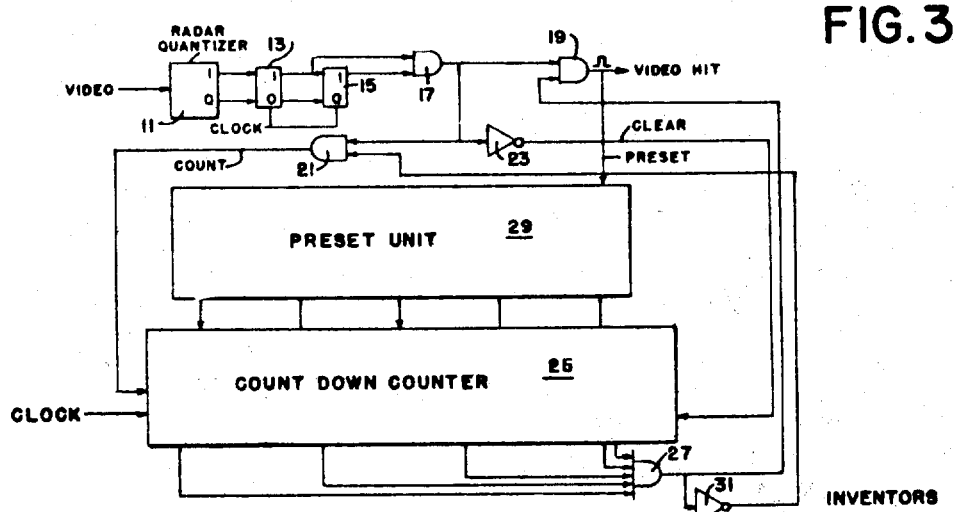
FIG. 1 is a block diagram showing a preferred embodiment of the present invention.

Referring now to the drawings, there is shown in FIG. 1 a block diagram arrangement of the present invention with the received radar video being fed into a radar quantizer 11. The output of the quantizer is dependent upon whether the radar video exceeds a predetermined threshold value. When the threshold exceeds the value, an output signal is passed to the set or one input of a flip-flop 13. Otherwise, an output signal is passed to the reset or zero input of this flip-flop. Flip-flop 13 in turn feeds a second flip-flop 15 with the corresponding signal during the next clock period. The set output of flip-flop 13 and the set output of flip-flop 15 each feed a two input AND gate 17 which provides a one or zero output signal depending upon whether the two inputs are similar or dissimilar.

Gate 17 provides an output signal which is fed to a two input AND gate 19, another two input AND gate 21, and an inverter 23 providing a complementary output signal for clearing the count in a count down counter 25. The output from each stage of the counter is fed to an AND gate 27 which is enabled when all inputs are at the zero level. The output of gate 27 serves as the input to gate 19 and when the two inputs to this gate are similar, the gate is enabled to declare a video hit. The output of gate 19 is also fed to a preset unit 29 which presets the count in counter 25. The output of gate 27 is also fed to an inverter 31 which provides a complementary output signal to the other input of gate 21. When gate 21 is enabled a count signal is passed to the counter 25 for initiating the count.

In operation, the dynamic hit-width discriminator receives as an input the quantized radar and operates on it to convert a normal return into a pulse having a width equal to the basic clock period, and to convert a lengthened return into a series of clock period pulses occurring at a rate equal to the memory resolution of the system. The operation is performed in such a manner as to have a minimal effect on the target resolution and accuracy of the detection portion of the radar system. In order to more fully explain the operation of the present invention, it is assumed that the radar system has an effective transmitted pulse width of up to 6 $\mu$sec. with a pulse spread of less than 2 and a system clock frequency of 2.588 megacycles per second. Thus, a 12 $\mu$sec. counter, 5 bit binary, is sufficient to count the required pulse periods. The size of the counter may, of course, be varied in accordance with the radar system requirements.

Prior to operating the discriminator, the normal radar pulse return must be determined. The counter 25 is then preset by means of the preset unit 29 to a value equal to or slightly greater than the pulse return. The preset unit may, for example, be in the form of two input AND gates with one input being set at the 1 or 0 binary level and the second input from gate 19 serving to enable the gates when the inputs are similar and thereby set a count in the stages of the counter. The counter may be of any suitable configuration for counting down. The allowable presets are given in the following table for the above assumed case. Thus, if the normal maximum radar return is measured as 3.2 $\mu$sec., then a preset of 1 0 1 1 1 (3.474 $\mu$sec.) is used.

TABLE OF PRESETS

| Binary preset | Pulse width in μsec. |
|---|---|
| 1 1 1 1 1 | .386 |
| 1 1 1 1 0 | .772 |
| 1 1 1 0 1 | 1.158 |
| 1 1 1 0 0 | 1.544 |
| 1 1 0 1 1 | 1.930 |
| 1 1 0 1 0 | 2.316 |
| 1 1 0 0 1 | 2.702 |
| 1 1 0 0 0 | 3.088 |
| 1 0 1 1 1 | 3.474 |
| 1 0 1 1 0 | 3.860 |
| 1 0 1 0 1 | 4.246 |
| 1 0 1 0 0 | 4.632 |
| 1 0 0 1 1 | 5.018 |
| 1 0 0 1 0 | 5.404 |
| 1 0 0 0 1 | 5.790 |
| 1 0 0 0 0 | 6.176 |
| 0 1 1 1 1 | 6.562 |
| 0 1 1 1 0 | 6.948 |
| 0 1 1 0 1 | 7.334 |
| 0 1 1 0 0 | 7.720 |
| 0 1 0 1 1 | 8.106 |
| 0 1 0 1 0 | 8.492 |
| 0 1 0 0 1 | 8.878 |
| 0 1 0 0 0 | 9.264 |
| 0 0 1 1 1 | 9.650 |
| 0 0 1 1 0 | 10.036 |
| 0 0 1 0 1 | 10.422 |
| 0 0 1 0 0 | 10.808 |
| 0 0 0 1 1 | 11.194 |
| 0 0 0 1 0 | 11.580 |
| 0 0 0 0 1 | 11.966 |

Figure 2:
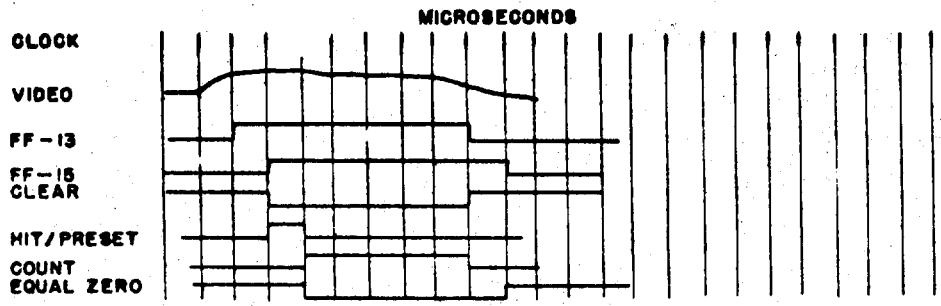
FIG. 2 is a waveform diagram explaining the operation of the device of FIG. 1 for a normal radar return.

Referring again to the drawings, FIG. 2 illustrates the operation of the discriminator for a radar return of normal width. As shown, when the video exceeds the threshold value of the quantizer, flip-flop 13 is set to provide a one level output signal. On the next clock period flip-flop 15 is set and gate 17 is enabled. Since inverter 23 provides a complementary signal, a clear signal is supplied to counter 25 when either flip-flop 13 or flip-flop 15 are reset. When the counter is cleared, 0 level signals are supplied to gate 27 enabling that gate and supplying a 1 level signal to gate 19. Thus, the enabling gate 17 results in gate 19 being enabled and a hit being declared. The enabling of gate 19 also causes a preset to be applied to the counter 25, the value of the preset being determined by reference to the table of presets. When the counter is preset, the output signals are no longer at the 0 level so that gate 27 is disabled and a 1 level signal is supplied to gate 21 by means of inverter 31. Thus, gate 21 becomes enabled and initiates a count in the counter. As shown in FIG. 2, when the value of the incoming video falls below the threshold value within the normal return value, flip-flops 13 and 15 are reset and the counter is cleared without counting down through zero. Accordingly, the discriminator operates to convert a normal return into a single pulse such that a single hit is declared.

Figure 3:
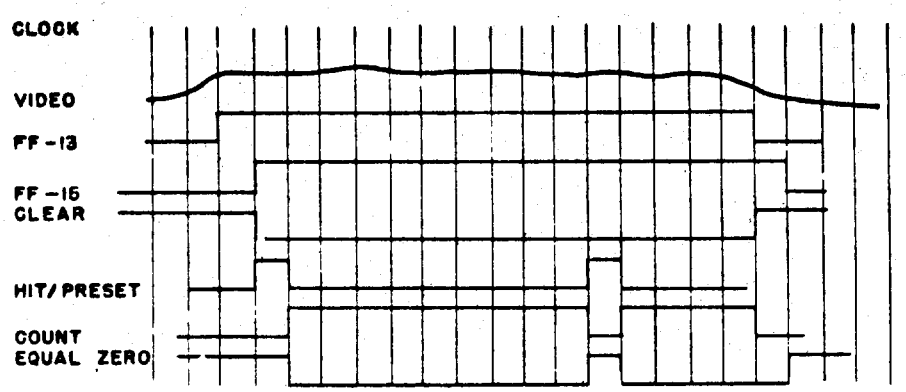
FIG. 3 is a waveform diagram explaining the operation of the device of FIG. 1 when the radar return exceeds the normal pulse width.

FIG. 3 illustrates the operation of the present invention for a stretched video radar return. In the case of cluter, superimposed, or stretched radar returns, it is desired to declare multiple hits at a rate equal to the rate at which the radar system can generate separate video returns. As shown in FIG. 3, flip-flops 13 and 16 remain set for an extended period of time with the first hit being declared in the manner described with reference to FIG. 2. However, in this case, the counter is able to completely count down through zero at which time each of the inputs to AND gate 27 are the same. As shown on the equal zero line, a pulse output from gate 27 is applied to gate 19 for declaring another video hit and for presetting the preset unit 29 of counter 25. Simultaneously the count gate 21 is disabled by the output of inverter 31 for a single clock period. When the counter is preset, gate 27 is disabled and the count gate 21 is again enabled permitting the counter to count down again. However, as before, when flip-flops 13 or 15 are reset, the counter is cleared without counting through zero with only two hits being declared for the radar return of FIG. 3.

Accordingly, it is seen that the present invention prevents multiple range reporting of single targets which extend over more than a single range cell by converting the normal return into a single pulse having a width equal to the basic clock period and for a stretched return which may be due to clutter, generates pulses at a rate equal to the normal real radar return pulse width. This permits proper operation of the integrating circuits of the statistical detectors and the automatic clutter eliminator generally associated with the radar systems.

Obviously many modifications and variations of the present invention are possible in the light of the above teachings. It should therefore be understood that within the scope of the appended claims, the invention may be practiced otherwise than as specifically described.

I claim:

1. In a radar system, a dynamic hit-width discriminator for converting a quantized normal radar return pulse into a single pulse having a width equal to the basic clock period and a stretched return into a series of pulses occurring at a rate equal to the rate at which the radar system can generate separate video returns, comprising in combination:
  (a) a count down counter for providing an output signal of a predetermined level when the counter cycles through zero;
  (b) presetting means for setting a count into said counter which corresponds to the normal radar pulse width; and
  (c) gating means associated with said counter and said presetting means, said gating means being responsive to the leading edge of a radar return video pulse for providing an output hit pulse and for simultaneously enabling said presetting means, said gating means also being responsive to the output of the counter for initiating a counting cycle after the counter has been preset and further being responsive to the trailing edge of the radar return video pulse for clearing the counter.

2. A dynamic hit-width discriminator as defined in claim 1 wherein said gating means responsive to the leading edge of the radar return includes:
  (a) first flip-flop means for receiving a quantized radar output signal and having first and second output states, said first state being enabled in response to the leading edge of a radar return pulse;
  (b) second flip-flop means responsive to said first flip-flop means and having first and second output states which are enabled by the corresponding output of said first flip means;
  (c) first AND gate means responsive to said first output states of said first and second flip-flop means for providing an output signal of a predetermined level when the inputs thereto are similar;
  (d) second AND gate means responsive to the output of the counter for providing an output signal of a predetermined level when the counter is set at zero; and
  (e) third AND gate means responsive to the output of said first and second AND gate means for providing an output hit pulse and for enabling said presetting means.

3. A dynamic hit-width discriminator as defined in claim 2 wherein said gating means for initiating the counting cycle includes:
  (a) first inverter means coupled to the output of said second AND gate means for providing an output signal which is the complement of the output signal of said second AND gate means; and (b) fourth AND gate means responsive to the output of said first AND gate means and said first inverter means for initiating the counting cycle of the counter such that said fourth AND gate means is enabled when the counter output is not equal to zero.

4. A dynamic hit-width discriminator as defined in claim 3 wherein said gating means for clearing the counter includes a second inverter coupled to the output of said first AND gate means for providing a clear output signal when said first AND gate means is disabled.

5. A dynamic hit-width discriminator as defined in claim 4 wherein the count set into the counter is equal to the normal radar return pulse width.

6. A dynamic hit-width discriminator as defined in claim 4 wherein the count set into the counter is slightly greater than the normal radar return pulse width.

References Cited

UNITED STATES PATENTS

| 3,267,464 | 8/1966 | Shames | 343—17.1 X |
| 3,344,421 | 9/1967 | Dildy | 343—17.1 X |

RODNEY D. BENNETT, JR., *Primary Examiner.*

CHARLES L. WHITHAM, *Assistant Examiner.*